United States Patent [19]

Rockne et al.

[11] Patent Number: 4,791,663

[45] Date of Patent: Dec. 13, 1988

[54] TELEPHONE STATUS RECOGNITION AND BYPASS SYSTEM

[75] Inventors: David T. Rockne, Shakopee, Minn.; Lowell E. Johnson, Tucson, Ariz.

[73] Assignee: Telident, Inc., Edina, Minn.

[21] Appl. No.: 161,254

[22] Filed: Feb. 22, 1988

Related U.S. Application Data

[63] Continuation of Ser. No. 06/828,774, Feb. 12, 1986, abandoned.

[51] Int. Cl.⁴ .............................................. H04M 3/42
[52] U.S. Cl. .................................... 379/113; 379/201; 379/221
[58] Field of Search ............... 379/157, 201, 210, 211, 379/212, 213, 214, 258, 271, 272, 273, 274, 219, 113, 221

[56] References Cited

U.S. PATENT DOCUMENTS

| | | | |
|---|---|---|---|
| 3,920,936 | 11/1975 | Mogtader | 179/18 DA |
| 3,997,731 | 12/1976 | Wilmot et al. | 379/201 |
| 4,072,825 | 2/1978 | McLay et al. | 179/18 AD X |
| 4,100,375 | 7/1978 | Noller | 179/18 AD X |
| 4,232,199 | 11/1980 | Boatwright et al. | 379/201 X |
| 4,296,282 | 10/1981 | O'Neil et al. | 179/18 AD X |
| 4,585,904 | 4/1986 | Mincone et al. | 179/7.1 R X |
| 4,645,879 | 2/1987 | Simmons | 379/212 X |

OTHER PUBLICATIONS

TeleSciences, advertisement, *Telephony*, Oct. 24, 1983, p. 36.
Teltone, advertisement, *Telephony*, Jan. 20, 1986, p. 27.

*Primary Examiner*—James L. Dwyer
*Attorney, Agent, or Firm*—Kinney & Lange

[57] ABSTRACT

A telephone status recognition and bypass system includes a plurality of status recognition units, and a controller. Each status recognition unit interfaces a subscriber's telecommunication line between a plurality of peripheral services and to a switch network, and includes status monitoring circuits and an SRU switch. The status monitoring circuits monitor status of calls incoming to and outgoing from the service subscriber, and produces status signals representative thereof. The SRU switch switchably interconnects the service subscriber, the switch network, and the peripheral services, for telecommunications in response to switching control signals. The controller is responsive to the status monitoring circuits, and produces switching control signals as a function of the status signals. The controller causes the SRU switch to interconnect the service subscriber to the selected peripheral service, thereby passing the switch network, when the status monitoring means produces status signals representative of an outgoing call from the service subscriber to the peripheral service.

15 Claims, 1 Drawing Sheet

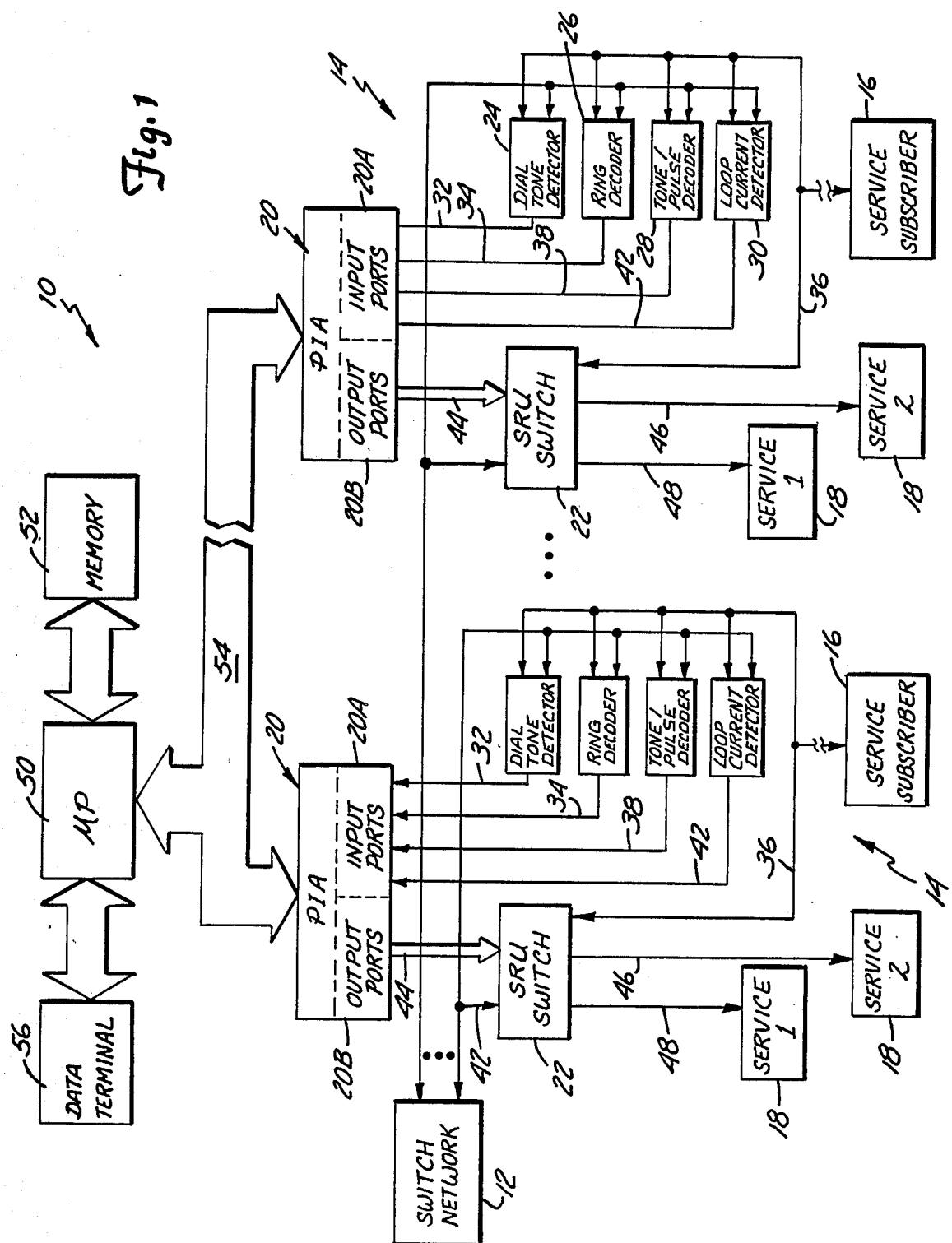

TELEPHONE STATUS RECOGNITION AND BYPASS SYSTEM

This is a continuation of application Ser. No. 06/828,774, filed Feb. 12, 1986 (now abandoned).

BACKGROUND OF THE INVENTION

1. Field of the Invention

The present invention relates generally to telephone switching apparatus. In particular, the present invention is a status recognition and bypass system permitting a service subscriber (customer) to interface directly to a peripheral service (e.g. long distance vendor) thereby bypassing a central office switch network thereby alleviating its load.

2. Description of the Prior Art

The 1984 breakup of AT&T has produced far reaching effects in the telecommunications industry. Two general segments now characterize the industry: Equipment and services. There are now many different companies making a wide variety of telecommunication equipment. While the service segment is now independent, it is divided into two categories. Local telecommunication services are provided by the local phone companies spun off from AT&T, or by one of the many independent local phone companies. Other services, namely long distance services, are provided by a variety of other vendors.

The divestiture has been a boon to equipment manufacturers and providers of specialized services. Equipment manufacturers are developing a wide range of products in an attempt to gain a share of what had been a relatively closed market over which the manufacturing arm of AT&T had control. The equipment market now includes customer-premises equipment such as telephones and PBX's, as well as central-office and toll switches purchased by local phone companies. Service providers such as long-distance vendors now compete to provide services which were provided exclusively by AT&T before devestiture.

Whatever the effects of divestiture on long term competition, it has at least temporarily plunged the telecommunications industry into chaos. Especially hard hit are the local telephone companies. Now that they are out from under the umbrella of AT&T, they are faced with problems integrating their existing switch networks to a wide variety of new customer-premises equipment, and to the many new service providers such as long distance vendors. The divestiture has, therefore, contributed to increased traffic loads of local telephone company switch networks. As a result, these local phone companies are faced with prospects of large capital expenditures for expanded switching facilities.

An alternative to capital expenditures for expanded switching facilities is to make "better" use of those currently installed. Capital expenditures could thereby be eliminated, or at least postponed until the many unsettled issues resulting from divestiture and affecting the decisions are resolved.

It is evident that there is a continuing need for telephone switching apparatus capable of interfacing with currently installed switch networks and alleviating heavy loads thereon. The switching apparatus must be relatively inexpensive so as to present an economically viable alternative to the purchase of expanded switching facilities. Furthermore, the switching apparatus must be extremely flexible and easily adapted to a variety of applications.

SUMMARY OF THE INVENTION

The present invention is a telephone status recognition and bypass system for interfacing each of one or more service subscriber's telecommunication lines to at least a first peripheral service and to a switch network. The system includes a status recognition unit (SRU) for each service subscriber, and control means interfaced thereto. Each status recognition unit includes status monitoring means and SRU switch means. The status monitoring means monitor status of outgoing calls from the service subscriber, and produce status signals representative thereof. The SRU switch means switchably interconnects the service subscriber, the switch network, and the first peripheral service, for telecommunications in response to switching control signals. The control means is responsive to the status monitoring means, and produces the switching control signals as a function of the status signals. The control means causes the SRU switch means to interconnect the service subscriber and the first peripheral service when the status monitoring means produces status signals representative of an outgoing call from the service subscriber to the peripheral service.

The status recognition and bypass system permits heavily used local telephone company switching equipment to be bypassed for many common types of telecommunication. By reducing the traffic loads in this manner, capital expenditure requirements for expanded switching facilities can be reduced, or at least postponed. Furthermore, the size and cost of new switches which are required can also be reduced. The telephone network status recognition and bypass system is extremely flexible, and can be programmed to operate in a variety of different modes. Most importantly, the system is relatively inexpensive, and offers a viable alternative to expanded switching facilities.

In preferred embodiments, the status recognition and bypass system also interfaces the service subscriber to a second peripheral service. The control means then causes the switch means to interconnect the service subscriber to the second peripheral service when the status monitoring means produces status signals representative of an outgoing call from a service subscriber to the second peripheral system.

The status monitoring means can also monitor status of incoming calls to the service subscriber and produce status signals representative thereof. The control means can then cause the SRU switch means to interconnect the service subscriber's incoming calls to the first second peripheral service when the status monitoring means produces signals representative of the service subscriber's incoming call, while at the same time producing signals indicating that the service subscriber's line is busy, or that the service subscriber is not answering the incoming call.

In still other embodiments, the system includes a data terminal for programming the control means. Information representative of numbers dialed by the service subscriber, and/or the duration of the calls made, can be stored in the control means, and retrieved through the data terminal for billing and other purposes.

BRIEF DESCRIPTION OF THE DRAWINGS

FIG. 1 is a block diagram representation of the telephone status recognition and bypass system of the present invention.

DETAILED DESCRIPTION OF THE PREFERRED EMBODIMENTS

Telephone status recognition and bypass system 10 of the present invention is illustrated generally in block diagram form by FIG. 1. Status recognition and bypass system 10 includes a plurality of status recognition units (SRU's) 14A and 14B, which interface service subscribers 16A and 16B with one or more remotely located peripheral services 18A, 18A' and 18B, 18B', respectively, such as special vendor srevices to which they subscribe, and a switch network 12. As will be understood from the following description, status recognition and bypass system 10 is extremely flexible and adaptable to a variety of applications.

Status recognition and bypass system 10 permits direct telecommunications between service subscribers 16A and 16B and services 18A, 18A' and 18B, 18B', respectively, by bypassing switch network 12, thereby reducing heavy traffic loads on currently installed telephone switch networks. As a result, large capital expenditures needed for expanded switching facilities will no longer be needed, or can be postponed. Status recognition and bypass system 10 can also be used for recordkeeping purposes.

Associated with SRU 14A (which is also representative of SRU 14B) is a peripheral interface adapter (PIA) 20A which includes both input ports 21A and output ports 23A, an SRU switch 22A, dial tone detector 24A, ring decoder 26A, tone/pulse decoder 28A, and loop current detector 30A. As shown, service subscriber 16A is interfaced for telecommunication with SRU switch 22A of SRU 14A through telecommunication line 36A. First and second services 18A and 18A', respectively, are interfaced with SRU switch 22A through telecommunication lines 48A and 46A, respectively. SRU switch 22A is interfaced for telecommunications with switch network 12 through telecommunication line 43A. Control signals from PIA output ports 23A are received by SRU switch 22A on bus 44A.

Dial tone detector 24A is preferably interconnected to both lines 36A and 43A and produces status signals representative of a dial tone on either line. These signals are supplied to PIA input ports 21A on line 32A. Ring decoder 26A is also preferably connected to lines 36A and 43A, and produces signals representative of a ringing voltage on the line indicative of an incoming call. These signals are supplied to PIA input ports 21A on line 34A.

Tone/pulse decoder 28A is preferably connected to lines 36A and 43A, and decodes the tones and/or pulses produced when an outside line is dialed. Signals representative of the particular line being called are supplied to PIA input ports 21A by line 38A. Loop current detector 30A is connected to lines 36A and 43A and produces signals representative of loop current on the respective line. These signals are supplied to PIA input ports 21A on line 43A. Depending upon the particular application to which system 10 is being adapted, and the status signals necessary therefor, dial tone detector 24A, ring decoder 26A, tone/pulse decoder 28A, or loop current detector 30A can be connected to only one, or neither, of lines 36A and 43A.

All SRU's 14A-14B are under the control of a control unit such as microprocessor 50 which includes associated memory 52. Microprocessor 50 is connected to receive status signals from PIA input ports 21A-21B of respective SRU's 14A-14B through bus 54. Control signals produced by microprocessor 50 are also supplied to PIA output ports 23A-23B of each SRU 14A-14B, respectively, through bus 54. Microprocessor 50 can be programmed, and other data entered into memory 52, through a data terminal 56.

Microprocessor 50 controls and monitors the status of individual SRU's 14A-14B through their respective PIA 20A-20B. The status of calls incoming to or outgoing from switch network 12 or service subscribers 16A-16B are monitored by microprocessor 50 by periodically sampling or polling PIA input ports 21A-21B of the subscriber's SRU 14A-14B, respectively. Utilizing a control program such as that stored in memory 52, microprocessor 50 produces switching control signals as a function of the particular status signals monitored. These control signals are supplied to SRU switches 22A-22B of SRU's 14A-14B through their PIA output ports 23A-23B, respectively (via bus 54). In response to the control signals, SRU switches 22A-22B switch so as to route certain incoming calls to service subscribers 16A-16B directly to services 18A, 18A' and 18B, 18B', respectively. Most importantly, calls from subscribers 16A-16B can be routed directed to services 18A, 18A' and 18B, 18B' through SRU switches 22A-22B, respectively, thereby bypassing switch network 12. Data representative of monitored status signals, including numbers of outside lines dialed by service subscribers 16A-16B, and the duration of those calls, can also be stored in memory 52.

Status recognition and bypass system 10 is well suited for interfacing service subscribers 16A-16B and/or switch network 12 with any of a number of different types of peripheral units such as services 18A, 18A' and 18B, 18B'. Service subscriber 16A could, for example, be an individual telephone of either a private customer, or a business with a private branch exchange (PBX). Alternatively, service subscribers 16A-16B can be individual lines from a telephone company incoming to a PBX. Switch network 12 can be the switch network of a PBX, or a telephone company central office switch network. Typical services 18A, 18A', 18B and 18B' which can be directly selected by use of the system include time and temperature services, flight schedule services, weather report services, and answering services. It is anticipated that one of the most common applications of system 10 will be to provide direct access to preselected long distance vendors. System 10 can also be used to directly interconnect service subscribers 16A-16B to a regularly used peripheral unit such as a computer.

Status recognition and bypass system 10 can operate in a variety of different modes in accordance with the above description. In one mode, system 10 is used by a business with a private branch exchange, or PBX. Switch network 12 is the switch network of the PBX, while service subscribers 16A-16B are the individual phones associated with the business' PBX. System 10 can be used to screen direct inward dialing (DID) calls made to the PBX.

All valid phone numbers associated with the PBX (i.e., the phone numbers of each phone, or service subscribers 16A-16B) are programmed into memory 52, such as through data terminal 56. When status signals representative of an incoming call to the PBX are received through PIA input ports 21A–21B, microprocessor 50 compares the number being called to those stored in memory 52. If the number is a valid one associated with the PBX, microprocessor 50 produces control signals which cause the call to be routed through SRU switch 22A–22B to the phone or subscribers 16A–16B, respectively, being dialed. If the number was invalid, control signals are produced at PIA output ports 23A–23B which cause SRU switch 22A–22B to route the call to a service 18A, 18A' and 18B, 18B', respectively, such as an announcement service which will inform the caller that an inactive number was dialed. Microprocessor 50 will maintain this interconnection until polled status signals indicate that the caller has hung up (loop current lost), or internal timing produces a disconnect command. Alternatively, if the number is valid but associated with a phone which is not to receive incoming calls, microprocessor 50 can recognize this event, and produce control signals causing SRU switch 22A–22B to route the call to a different announcement service 18A, 18A' and 18B, 18B', respectively.

In a second embodiment, one which is a variation of that discussed above, microprocessor 50 can monitor outgoing calls from the phone of each service subscribers 16A–16B. If all or certain outgoing calls, such as long distance calls, are to be prohibited, microprocessor 50 can recognize these particular calls through status signals received at PIA input ports 21A–21B, and either terminate the call, or produce control signals causing it to be directed through SRU switch 22A–22B, respectively, to an alternative service such as a recorded message.

In another application, service subscriber 16A makes frequent long distance calls, all of which are made through a preselected long distance vendor (service 18A). Whenever the polled status signals present on input ports 21A indicate that subscriber 16A is requesting service 18A, microprocessor 50 produces control signals which causes SRU switch 22A to directly interconnect line 36A of subscriber 16A to the selected service 18A. Switch network 12, the switch network of a telephone company central office, is thereby bypassed, alleviating its load. In addition, a record of all long distance calls made by service subscriber 16A can be stored in memory 52 and retrieved at a later data through data terminal 56 for billing purposes.

A fourth application involves the use of alternate service 18A, 18A', and 18B, 18B' such as an answering service. Microprocessor 50 monitors status signals representative of ringing voltage on line 43A of subscriber 16A when a call is incoming. If the ring count reaches a predetermined number, (i.e., when subscriber 16A is not present to answer the phone), microprocessor 50 produces control signals causing the call to be routed directly to the answering service through SRU switch 22A.

Yet another application combines several of the features described above. When line 36A of service subscriber 16A is busy, such as when interconnected to a first service 18A through SRU switch 22A, or to another outside line through switch network 12, microprocessor 50 can cause additional incoming calls to be routed to a second service 18' such as an answering service.

As the above description indicates, status recognition and bypass system 10 is very flexible.

It is to be understood that the above examples are merely illustrative, and not exhaustive of the many applications to which status recognition and bypass system 10 can be adapted. The system is relatively inexpensive to produce, as all of the elements described with reference to FIG. 1 are commercially available. Persons skilled in the art can easily implement both the hardware and software of the system in accordance with the above description.

Although the present invention has been described with reference to preferred embodiments, workers skilled in the art will recognize that changes may be made in form and detail without departing from the spirit and scope of the invention.

What is claimed is:

1. A telephone status recognition and bypass system for interfacing, at a central office, each of at least one remotely located service subscriber's telecommunication lines to at least a first remotely located peripheral service over a first alternate trunk, and to a switch network at the central office, including:
   at least one status recognition unit (SRU) including:
      signaling monitoring means interfaced to a service subscriber's telecommunication lines at the central office for monitoring signaling of outgoing calls from the service subscriber, and for producing signaling signals representative thereof; and
      SRU switch means interfacing the central office switch network, service subscriber's telecommunication lines and first alternate trunk, at the central office, for switchably interconnecting the service subscriber, the switch network, and a first remotely located peripheral service for telecommunications in response to switching control signals; and
   control means responsive to the signaling monitoring means for producing switching control signals as a function of the signaling signals, wherein the control means causes the SRU switch means to interconnect the service subscriber to the first remotely located peripheral service over the first alternate trunk, thereby bypassing the central office switch network, when the signaling monitoring means produces signaling signals representative of an outgoing call from the service subscriber to the peripheral service.

2. The telephone status recognition and bypass system of claim 1 wherein:
   the system further interfaces the service subscriber to a second remotely located peripheral service over a second alternate trunk;
   the SRU switch means further includes means interfacing the central office switch network, service subscriber's telecommunications lines and the second alternate trunk, at the central office, for switchably interconnecting the service subscriber, the switch network, and the second remotely located peripheral service over the second alternate trunk, for telecommunications in response to switching control signals; and
   the control means causes the SRU switch meant to interconnect the service subscriber to the second remotely located peripheral service over the second alternate trunk when the signaling monitoring means produces signaling signals representative of an outgoing call from the service subscriber to the second peripheral service.

3. The telephone status recognition and bypass system of claim 2 wherein the signaling monitoring means further includes means for monitoring signaling of the service subscriber's incoming calls through the central office switch network and produces signaling signals representative thereof.

4. The telephone status recognition and bypass system of claim 3 wherein the control means causes the SRU switch means to interconnect the service subscriber's incoming calls to either the first or second peripheral services when the signaling monitoring means produces signaling signals representative of an incoming call to the service subscriber, while producing signaling signals indicating that the service subscriber's line is busy.

5. The telephone status recognition and bypass system of claim 3 wherein the control means causes the SRU switch means to interconnect the service subscriber's incoming calls to either the first or second peripheral services when the signaling monitoring means produces signaling signals representative of incoming calls to the service subscriber, and signaling signals indicating that the service subscriber is not answering the incoming call.

6. The telephone status recognition and bypass system of claim 1 wherein the control means causes the SRU switch means to interconnect the service subscriber to the first peripheral service when the signaling monitored means produces signaling signals representative of a prohibited outgoing call from the service subscriber.

7. The telephone status recognition and bypass system of claim 1 and further including a plurality of status recognition units, each of which is connected to the control means at the central office and interfaces a service subscriber's telecommunication lines to at least a first peripheral service and to the central office switch network.

8. The telephone status recognition and bypass system of claim 1 wherein the control means includes memory means for storing data.

9. The telephone status recognition and bypass system of claim 8 wherein the control means causes data representative of outgoing calls from the service subscriber to be stored in the memory means.

10. The telephone status recognition and bypass system of claim 9 wherein the control means causes data representative of phone numbers of outgoing calls from the service subscriber to be stored in the memory means.

11. The telephone status recognition and bypass system of claim 9 wherein the control means causes data representative of a time duration of outgoing calls from the service subscriber to be stored in the memory means.

12. The telephone status recognition and bypass system of claim 8 and further including data terminal means for programming the control means.

13. The telephone status recogniton and bypass system of claim 1 wherein the signaling monitoring means includes:
- a dial tone detector for producing signals representative of a dial tone on the service subscriber's line;
- a ring decoder for producing signals representative of a ringing voltage on the service subscriber's line indicative of an incoming call;
- a tone/pulse decoder for producing signals representative of outgoing calls from the service subscriber; and
- a loop current detector for producing signals representative of loop current on the service subscriber's line.

14. The telephone status recognition and bypass system of claim 1 wherein the control means comprises a microprocessor.

15. The telephone status recognition and bypass system of claim 1 and further including programmable interface adapter means for interfacing the control means to the signaling monitoring means and SRU switch means.

* * * * *